(12) United States Patent
DiBenerdini et al.

(10) Patent No.: US 11,319,217 B2
(45) Date of Patent: May 3, 2022

(54) METHOD AND APPARATUS FOR WATER PURIFICATION USING CONTINUOUS HYDROTHERMAL OXIDATION REGIME

(71) Applicant: Clean Water Ventures, Inc., Reno, NV (US)

(72) Inventors: Roy H. DiBenerdini, Barrington, RI (US); Bernard F. Coll, Fountain Hills, CA (US)

(73) Assignee: Clean Water Ventures, Inc., Reno, NV (US)

( * ) Notice: Subject to any disclaimer, the term of this patent is extended or adjusted under 35 U.S.C. 154(b) by 0 days.

(21) Appl. No.: 16/996,775

(22) Filed: Aug. 18, 2020

(65) Prior Publication Data

US 2020/0377380 A1 Dec. 3, 2020

Related U.S. Application Data

(63) Continuation of application No. 16/378,406, filed on Apr. 8, 2019, now Pat. No. 10,752,518.

(60) Provisional application No. 62/752,942, filed on Oct. 30, 2018.

(51) Int. Cl.
*C02F 1/04* (2006.01)
*C02F 103/10* (2006.01)
*C02F 1/16* (2006.01)
*E21B 43/26* (2006.01)

(52) U.S. Cl.
CPC .............. *C02F 1/048* (2013.01); *C02F 1/041* (2013.01); *C02F 1/045* (2013.01); *C02F 1/16* (2013.01); *C02F 2103/10* (2013.01); *C02F 2301/08* (2013.01); *E21B 43/26* (2013.01)

(58) Field of Classification Search
CPC .............. C02F 1/04–18; C02F 2103/10; C02F 2301/08; E21B 43/26
See application file for complete search history.

(56) References Cited

U.S. PATENT DOCUMENTS

| | | | | |
|---|---|---|---|---|
| 6,596,178 | B1 * | 7/2003 | Archibald | B01D 3/42 |
| | | | | 122/26 |
| 6,761,865 | B1 * | 7/2004 | Gallup | C01B 33/22 |
| | | | | 210/696 |
| 7,845,314 | B2 * | 12/2010 | Smith | B01D 1/14 |
| | | | | 122/379 |
| 9,272,912 | B2 * | 3/2016 | Rossi | C04B 2/10 |
| 9,776,102 | B2 * | 10/2017 | Frick | C02F 1/16 |

(Continued)

*Primary Examiner* — Jonathan Miller
(74) *Attorney, Agent, or Firm* — Jaquez Land Greenhaus & McFarland LLP; Bruce W. Greenhaus, Esq.

(57) ABSTRACT

A system and method for cleaning dirty water is disclosed. The systems and methods may include two heat exchangers, including a high temperature/high pressure (HT/HP) heat exchanger that receives superheated steam and hydrogen gas and a low temperature/low pressure (LT/LP) that receives steam at a reduced temperature and pressure. The LT/LP heat exchanger provides first stage heating to dirty water that is input into the system for cleansing. The LT/LP heat exchanger has a first coil and a second coil. The first coil carries the dirty water to be cleaned. The HT/HP heat exchanger provides a second stage of heating to the dirty water that is output from the LT/LP heat exchanger. A first coil of the HT/HP heat exchanger carries the superheated steam and hydrogen gas. A second coil carries the preheated dirty water that is output from the LT/LP heat exchanger.

9 Claims, 5 Drawing Sheets

(56) References Cited

U.S. PATENT DOCUMENTS

| | | | |
|---|---|---|---|
| 10,039,996 B2* | 8/2018 | Frick | B01D 3/007 |
| 10,166,489 B2* | 1/2019 | Frick | B01D 5/006 |
| 2009/0208402 A1* | 8/2009 | Rossi | C01B 32/50 |
| | | | 423/438 |
| 2011/0286913 A1* | 11/2011 | Lugtigheid | C01B 3/065 |
| | | | 423/658.2 |
| 2014/0014492 A1* | 1/2014 | Younes | C02F 1/06 |
| | | | 203/11 |
| 2014/0137779 A1* | 5/2014 | Pronske | F22B 1/18 |
| | | | 110/345 |
| 2014/0154173 A1* | 6/2014 | Phillips | C01B 3/08 |
| | | | 423/657 |
| 2014/0158517 A1* | 6/2014 | Shirley | C02F 1/048 |
| | | | 203/10 |
| 2015/0008189 A1* | 1/2015 | Mizutani | C01B 33/22 |
| | | | 210/714 |
| 2015/0360941 A1* | 12/2015 | Macrae | C01F 7/428 |
| | | | 423/627 |
| 2017/0121581 A1* | 5/2017 | Horiike | F25B 13/00 |
| 2017/0321882 A1* | 11/2017 | Naterer | F22B 1/06 |

* cited by examiner

METHOD AND APPARATUS FOR WATER PURIFICATION USING CONTINUOUS HYDROTHERMAL OXIDATION REGIME

CROSS-REFERENCE TO RELATED APPLICATIONS—CLAIM OF PRIORITY

The present application is a continuation of, and claims priority to, and commonly assigned U.S. patent application Ser. No. 16/378,406, filed Apr. 8, 2019, entitled "Method and Apparatus for Water Purification using Continuous Hydrothermal Oxidation Regime", and the contents of said application is incorporated herein by reference in its entirety. Application Ser. No. 16/378,406 claims priority to U.S. Provisional Application No. 62/752,942, filed on Oct. 30, 2018, entitled "Continuous Hydrothermal Oxidation Regime", which is herein incorporated by reference in its entirety.

(1) TECHNICAL FIELD

This disclosure relates to a method and apparatus for cleaning dirty water using scrap aluminum as fuel for a hydrothermal oxidation process resulting in distilled water, aluminum hydroxide, produce hydrogen and energy.

BACKGROUND

Oil and gas development that is done with hydraulic fracturing (commonly known as fracking) requires significant amounts of water. Hydraulic fracturing is an oil and natural gas production technique that involves the injection of millions of gallons of water, plus chemicals and sand, underground at very high pressure in order to create fractures in the underlying geologic formations to allow natural gas to escape. The sand is used to keep the fractures open and allow oil or gas to flow more efficiently. Hydraulic fracturing is commonly used in many types of geologic formations such as coal beds, shale plays, and previously drilled wells to further stimulate production. Shale gas is found in shale "plays," which are shale formations containing significant accumulations of natural gas and which share similar geologic and geographic properties.

FIG. 1 is an illustration of the site of a fracking operation. A hole is drilled in the ground into which a casing is laid. Fracking fluid is pumped under pressure into the casing and down through the earth into a gas/oil-bearing formation below. The fracking fluid opens hydraulic fractures that are held open by the sand. Oil or gas trapped in the gas/oil-bearing formation traverses the hydraulic fractures and is extracted up through the casing. In addition, wastewater exits the casing at the surface and is collected in wastewater ponds near the hole.

Thirty-three states have oil and/or natural gas production and, according to the Interstate Oil and Gas Compact Commission, more than 90% of U.S. oil and natural gas wells use hydraulic fracturing. Tens of thousands—if not hundreds of thousands—more wells are planned across the country over the next decade. Hundreds of different types of chemicals are used in fracking operations. In some cases, hydraulic fracturing fluids can contain a variety of substances, such as diesel fuel, acids, and acetone. These substances make it difficult to dispose of the very large amounts of water used in fracking. While only a small fraction of the fluid volume used in any fracturing operation consists of undesirable substances, the volume of fluids needed for each "frack job" is so great, sometimes millions of gallons, that a relatively small amount of contaminant can cause a major problem in the disposal of the wastewater. Furthermore, water continues to be a precious resource on its own. Therefore, it is of value to clean and recover as much of the water as possible. The water that is recovered could then be used for further fracking jobs, returned to local waterways, such as streams and rivers, etc., or used for other purposes.

Cleaning up the wastewater from a fracking site can be an expensive and difficult task. Therefore, there is a significant need for a method and apparatus that can be used to clean up dirty wastewater from uses like fracking that produce relatively large quantities of contaminated wastewater. The term "dirty water" is used through this disclosure to refer generally to any aqueous solution that comprises elements that would be desirable to have removed from the $H_2O$ in which those elements are suspended, dissolved, or otherwise combined.

As a separate matter, it should be noted that alumina is used in a wide spectrum of non-metallurgical applications. These include: (1) manufacturing of ceramics, (2) to adsorb gases; (3) as a catalysis; and (4) as an active substance carrying agent, etc. The principle way alumina is produced today is by a method called the "Bayer process". The Bayer process is the principal industrial means of refining bauxite to produce alumina (aluminium oxide). Bauxite is the most important ore of aluminium. It contains only 30-60% aluminium oxide ($Al_2O_3$). The rest of the material is a mixture of silica, various iron oxides, and titanium dioxide. In the Bayer process, bauxite ore is heated in a pressure vessel along with a sodium hydroxide solution (caustic soda) at a temperature of 150° C. to 200° C. At these temperatures, the aluminium is dissolved as sodium aluminate in an extraction process. After separation of the residue by filtering, aluminium hydroxide is precipitated when the liquid is cooled and then seeded with fine-grained aluminum hydroxide.

However, in many cases, the Bayer-produced alumina does not meet the increasingly high requirements imposed for use of alumina in many current applications. Some of these requirements include: (1) having an advanced surface, (2) having a high level of chemical purity, and (3) having a relatively high level of phase homogeneity. In some such cases, the desired physical and chemical properties are achieved by additional steps, such as mechanical milling, application of a "sol-gel technique", use of chemical vapor deposition, controlling the atmosphere calcination and other techniques. The necessity of each step depends on the particular requirements for the desired alumina properties. In order to provide a more efficient process, a method of advanced materials production referred to as hydrothermal processing has come to the attention of some people. The term hydrothermal processing covers the broad spectrum of different techniques. It commonly implies the use of aqueous solutions at elevated temperatures (>100° C.) and pressures (>0.1 MPa).

While hydrothermal processing includes the extraction of pure Al(OH)3 as performed by the Bayer process, newer hydrothermal techniques tend to use higher temperatures and pressures (in near-critical or supercritical field) than that of the Bayer process (200° C., 3 MPa). However, the success of such advanced materials production techniques used under hydrothermal conditions is usually bound up with unique properties, such as the density, viscosity, ionic product, dielectric constant, etc. of water at high temperature and pressure. While the changes that occur in the properties of water over temperature and pressure are well known, the role of water and the mechanism of chemical reactions under hydrothermal conditions are not always clear. The particular role of water and the particular mechanism in play can change depending on the particular reaction and reaction conditions.

In addition, the cost of producing aluminum hydroxide through the hydrothermal process can make it impractical or uneconomical to do so. Even in cases in which the market can support production of aluminum hydroxide through the hydrothermal process, the cost of the resulting aluminum hydroxide can be high. Therefore, it would be desirable to provide a means by which pure aluminum hydroxide may be produced at a lower cost.

The presently disclosed method and apparatus provides an efficient and cost effect method and apparatus for both cleaning contaminated wastewater and producing economical and useful aluminum hydroxide (and other useful byproducts) in an environmentally clean and efficient way that is beneficial to the environment.

SUMMARY OF THE INVENTION

A system and method for cleaning dirty water is disclosed. In some embodiments of the disclosed systems and methods, the systems and methods include two heat exchangers, including a high temperature/high pressure (HT/HP) heat exchanger that receives superheated steam and hydrogen gas and a low temperature/low pressure (LT/LP) that receives steam at a reduced temperature and pressure. The LT/LP heat exchanger provides first stage heating to dirty water that is input into the system for cleansing. The LT/LP heat exchanger has a first coil and a second coil. The first coil carries the dirty water to be cleaned. The second coil carries the reduced temperature steam provided from the HT/HP heat exchanger. The HT/HP heat exchanger provides a second stage of heating to the dirty water that is output from the LT/LP heat exchanger. Like the LT/LP heat exchanger, the HT/HP heat exchanger has a first and second coil. The first coil carries the superheated steam and hydrogen gas. The second coil carries the preheated dirty water that is output from the LT/LP heat exchanger.

The system further comprises a boiler combustion chamber (BCC) in which a hydrothermal oxidation reaction takes place to provide the heat necessary to superheat the steam and hydrogen gas that is provided to the first coil of the HT/HP heat exchanger. The hydrothermal oxidation reaction is fueled by fine particles of aluminum that, in some embodiments, are ground from scrap aluminum by a grinder within the system. In addition to heating the steam and hydrogen gas, the hydrothermal oxidation reaction results in aluminum hydroxide precipitating to the bottom of the BCC. The resulting aluminium hydroxide is removed from the BCC and can be used for various purposes. Still further, in some embodiments, the steam derived from the dirty water (i.e., that is output from the second coil of the HT/HP heat exchanger) can be used to drive a steam turbine to generate electricity or otherwise convert the steam to a useable form of power. The steam can then be captured and condensed to distilled water. In addition, the superheated hydrogen gas that is emitted from the BCC with the superheated steam is separated from the steam and can be collected in a holding tank as an additional value resource that can be sold or otherwise used.

The details of one or more embodiments of the invention are set forth in the accompanying drawings and the description below. Other features, objects, and advantages of the invention will be apparent from the description and drawings, and from the claims.

DESCRIPTION OF DISCLOSED METHOD AND APPARATUS

The process disclosed herein provides an efficient method to clean dirty wastewater and to produce aluminum hydroxide and additional valuable products, such as hydrogen that can be used to power fuel cells or otherwise commercialized, etc. In some embodiments, the process produces steam for powering external devices, such as steam turbines, etc. Other byproducts, such as salt may also be separated from the wastewater and commercialized.

By cleaning dirty wastewater and producing aluminum hydroxide together in a plant in which other valuable products are also produced, cleaning the water, producing the aluminum hydroxide and producing the other products is performed in an efficient and cost-effective manner. In some embodiments, the water to be cleaned is contaminated wastewater from fracking (i.e., performing a hydraulic fracturing operation). However, other contaminated or dirty water can be processed by the plant. The disclosed method and apparatus for treating produced water is inexpensive and clean. The plant is environmentally friendly and runs at 99.9% efficiency. Steam and/or hydrogen can be used to produce relatively low-cost electricity, the sale of which, together with the sale of aluminum hydroxide, can be used to offset the cost of cleaning the wastewater. The disclosed method and apparatus can reduce or eliminate certain components of the water treatment supply chain typically required in fracking operations.

In some embodiments, cleaning dirty water is the primary goal of the plant. However, in other embodiments, the primary goal may be to produce one of the other above-mentioned valuable commodities, such as steam for powering a turbine. For example, in one embodiment, the plant can be used as an electric power plant that also serves as a desalination plant for purifying ocean salt water to potable water. Alternatively, in arid regions, the main justification for the plant may be the desalination of water, and the generation of electricity and aluminum hydroxide are valuable byproducts. The particular commodities that are produced are not necessarily limited to a particular combination of the above-mentioned commodities. Nor is there a limit regarding the determination as to which product or commodity is more central to the process. In the most efficient plants, all possible byproducts are put to their best and highest use.

Figure 1:
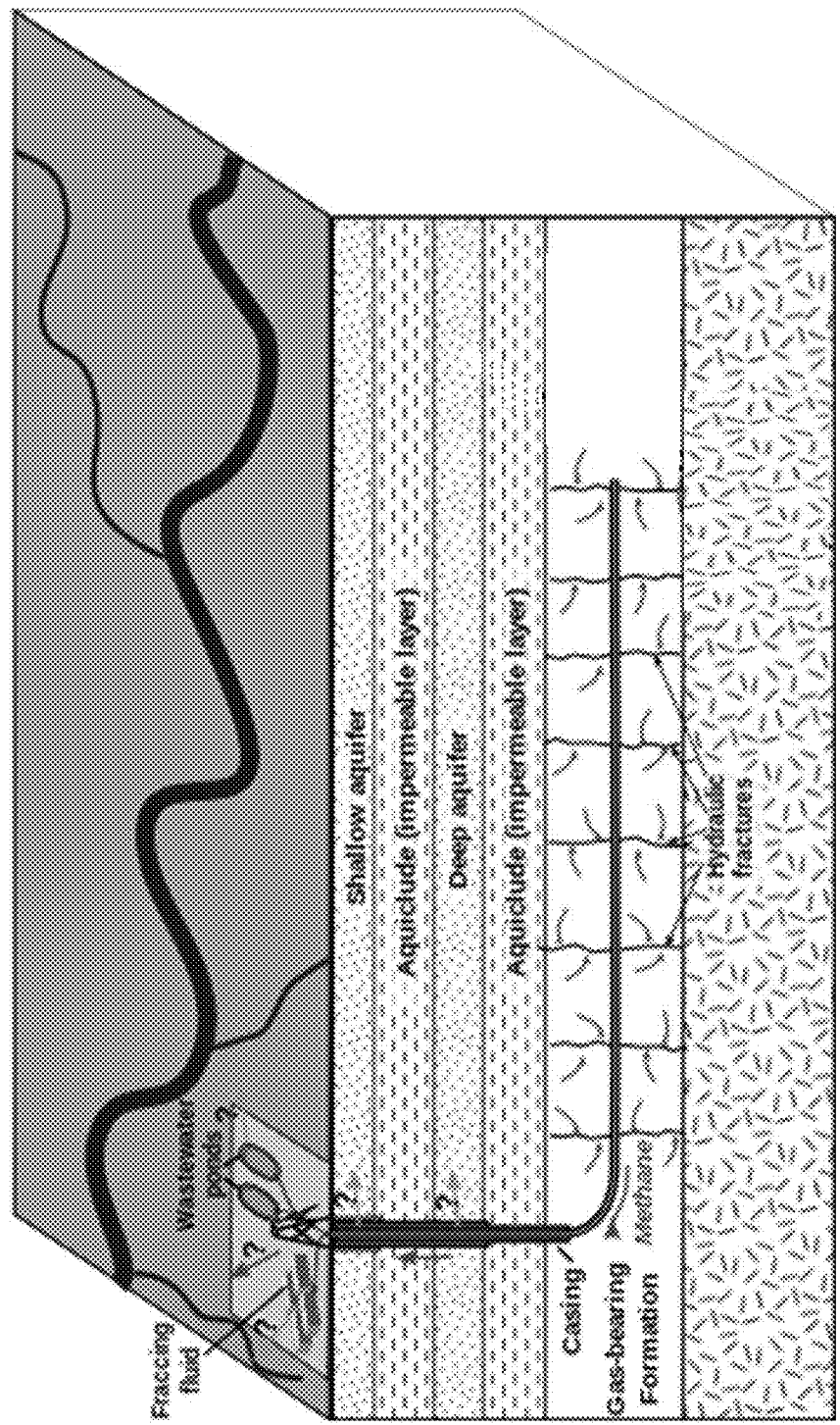
FIG. 1 is an illustration of the site of a fracking operation.
Figure 2:
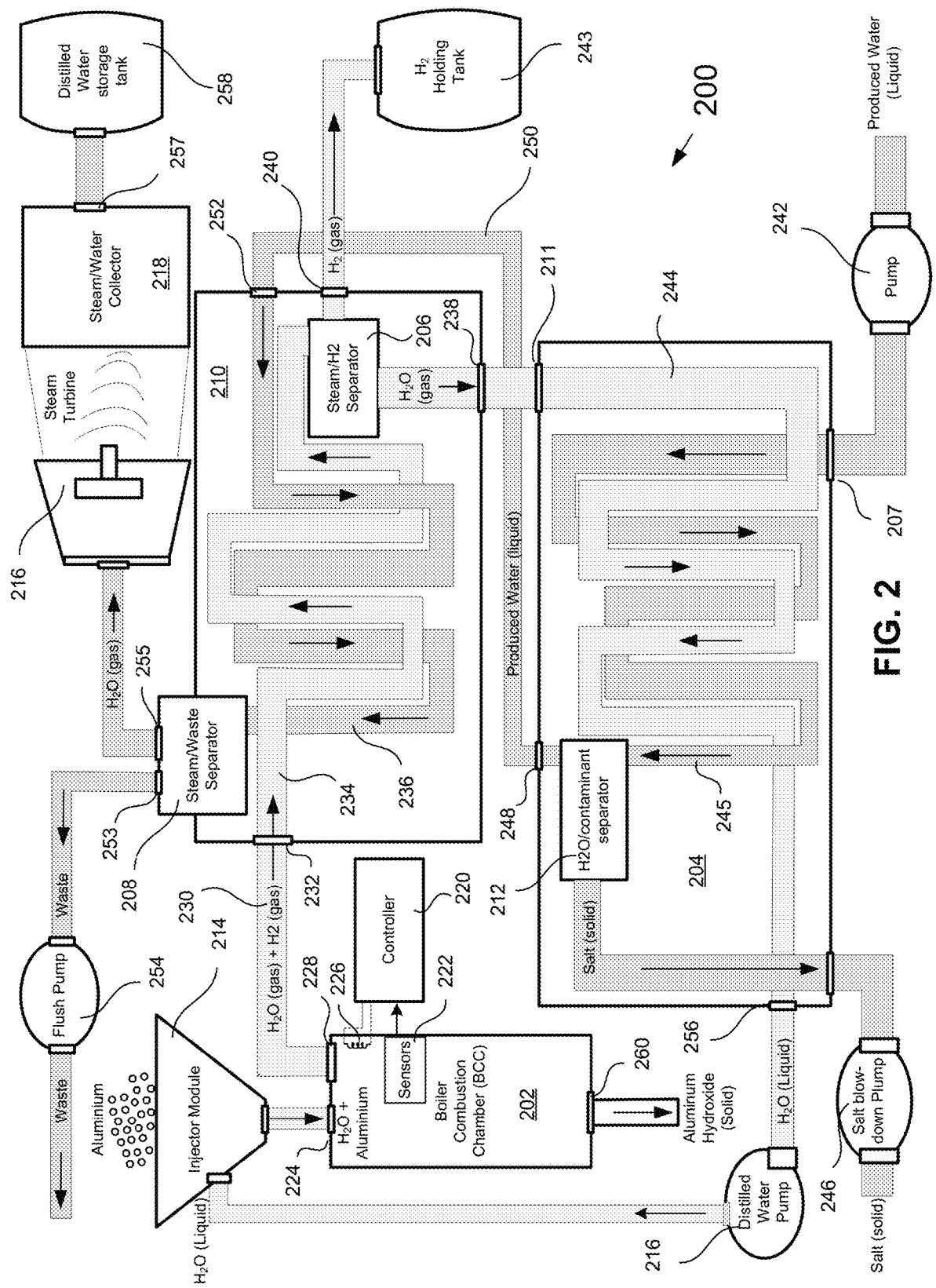
FIG. 2 is a simplified schematic of a plant used to implement a system in accordance with one embodiment of the disclosed method and apparatus.

FIG. 2 is a simplified schematic of a plant 200 used to implement a system in accordance with one embodiment of the disclosed method and apparatus. The plant 200 comprises a "boiler combustion chamber" (BCC) 202, a low temperature/low pressure (LT/LP) heat exchanger 204, a steam ($H_2O$)/hydrogen ($H_2$) separator 206, a steam/waste separator 208, a high temperature/high pressure (HT/HP) heat exchanger 210, a $H_2O$/contaminant separator 212, an injector module 214, a steam turbine 216, and a steam/water collector 218.

Operation of the Plant

An exothermic reaction takes place in the BCC 202 to generate heat. In particular, the reaction is a hydrothermal oxidation reaction between aluminum and water. The aluminum and water enter the BCC 202 through the injector module 214. The term "hydrothermal" commonly implies the use of aqueous solutions at elevated temperatures (>100° C.) and pressures (>0.1 MPa). One example of hydrothermal processing is the extraction of pure $Al(OH)_3$ in the above-mentioned Bayer process. However, in some embodiments, the reaction that takes place in the BCC 202 involves higher temperature and pressure (in near-critical or supercritical field) than that of the Bayer process (200° C., 3 MPa). Such hydrothermal oxidation reactions are well known and their use has been documented for several purposes.

In accordance with one embodiment of the process, aluminum and water are provided as fuel to the BCC 202. In accordance with the method and apparatus disclosed herein, aluminum is ground into a fine powder having particles that are in the range of approximately 10ths of a micron to millimeter size. In some embodiments, the aluminum to be ground is attained as "scrap aluminum". That is, the aluminum to be ground for use in the reaction can be attained from manufacturers that have no further use for the particular pieces of aluminum, such pieces that are too small to be useful to the manufacturer.

In general, several factors control the rate at which the reaction will occur in the BCC 202. These factors include: (1) the size of the particles of aluminum injected into the BCC 202, (2) the amount of aluminum and water injected into the BCC 202, (3) the temperature and the pressure within the BCC 202 and (4) the purity of the water injected into the BCC 202 (including PH of the water). By controlling these factors, the rate at which the reaction occurs can be controlled. In some embodiments, sensors 222 are strategically placed to provide feedback regarding the temperature and pressure of the BCC 202. The sensors 222 are coupled to a controller 220. It should be noted that the illustration of the sensors 222 in FIG. 2 is not intended to indicate the relative location within the BCC 202 of the sensors 2221. In some embodiments, the controller 220 controls the rate at which the water and aluminum particles enter the BCC 202 through an input port 224 and associated flow control valve (not shown) in response to feedback from the sensors 222. In addition, in some embodiments, the size of the aluminum particles is controlled. That is, aluminum scrap is input to the system through the injector module 214. The scrap aluminum is ground, shredded, or otherwise processed to reduce the size of the input scrap pieces and provide aluminum particles of a size that result in the reaction occurring at a desired rate. In some such embodiments, the process is controlled to attain and then maintain an operating temperature within the BCC 202 of approximately 280-320 degrees centigrade (approximately 475-610 degrees Fahrenheit). However, other operating temperatures are within the scope of the disclosed method and apparatus. In addition, in some embodiments, an operating pressure of approximately 6-10 MPa (Megapascals) is initially attained and then maintained within the BCC 202 by controlling the factors noted above.

In some embodiments, the reaction is started by heating the contents of the BCC 202 sufficiently to allow the reaction to begin. By fueling the reaction with relatively small particles of aluminum (e.g., 10ths of a micron to millimeter size), the reaction may be initiated without the need for an additional catalyst. Nonetheless, in other embodiments, a catalyst may be used, such as sodium hydroxide (NaOH), calcium hydroxide ($Ca(OH)2$) aqueous solutions. The hydroxide ions (OH—) from NaOH solutions are able to destroy the protective oxide layer on the aluminum surface. The aluminum is gradually dissolved in the water/alkaline environment even at room temperature, resulting in nearly immediate hydrogen production.

In some embodiments, a heater element 226 within the BCC 202 is used to initially increase the internal temperature of the contents of the BCC 202 to near the operating temperature. As the contents of the BCC 202 are heated, the pressure within the BCC 202 is allowed to rise in response to the rise in temperature. Once the reaction starts to occur spontaneously, power to the heater 226 can be reduced and eventually removed, as heat from reaction overtakes the heat provided by the heater 226. In some embodiments, information is provided by the sensors 222 in the BCC 202 as feedback for the process. This information is used by the controller 220 to control the reaction to produce the desired amount of heat. In addition, the controller 220 controls the amount of heat that is added by the heater 226 to initiate the reaction. Furthermore, the controller 220 controls the amount of water provided to the BCC 202, aluminum provided to the BCC 202, the size of the aluminum particles, and the pressure within the BCC 202. It should be noted that the illustration of the heater in FIG. 2 is not intended to indicate the relative size of the heater 226 nor the relative location within the BCC 202 of the heater 226.

In some embodiments in which the BCC operating temperature is in the range of approximately 280 degrees centigrade to 320 degrees centigrade at a pressure in the range of approximately 6 to 10 Megapascals, aluminum enters the BCC 202 at a flow rate of approximately 10-15 kilograms per hour through the injector module 214. Water enters through the injector module 214 at a rate of approximately 85-100 liters per hour. At the above noted rate, the process is capable producing 20 kilowatts of power, 22-33 kilograms per hour of aluminum hydroxide, and 15-20 cubic meters per hour of hydrogen gas. This process can be scaled up or down.

Once the reaction is occurring spontaneously under the control of the controller 220, superheated steam and hydrogen gas are output from the BCC 202 through a steam/$H_2$ output valve 228. The superheated steam and hydrogen gas are coupled through a high temperature steam pipe 230 to a steam/$H_2$ input valve 232 in the HT/HP heat exchanger 210. The HT/HP heat exchanger 210 transfers heat through a thermal coupling between a first heat exchange coil 234 and a second heat exchange coil 236 within the heat exchanger 210. In some embodiments, the first coil 234 is placed in close proximity to the second coil 236 to create the thermal coupling and allow heat to transfer from the first coil 234 to the second coil 236. In some embodiments, the contents of the first coil 234 and the contents of the second coil 236 are completely isolated from one another so that no contamination is transferred from the contents of one coil to the other.

In some embodiments, the temperature of the steam and $H_2$ output from the BCC 202 is approximately 280°-320° C. (i.e., the approximate temperature at which the reaction takes place in the BCC 202). Depending upon the efficiency with which the heat transfers from the first coil 234 to the second coil 236, the contents of the second coil 236 will exit the HT/HP heat exchanger 210 at a temperature that is slightly less than the operating temperature of the BCC 202 (approximately 280°-320° C.).

The steam/$H_2$ separator 206 resides near the output of the first coil 234. In some embodiments, the steam/$H_2$ separator 206 resides within the HT/HP heat exchanger 210. While the illustration shown in FIG. 2 shows only the configuration in which the steam/$H_2$ separator 206 resides within the HT/HP heat exchanger 210, in other embodiments not expressly depicted for the sake of efficiency, the steam/$H_2$ separator 206 resides outside the HT/HP heat exchanger 210. The steam/$H_2$ separator 206 separates the steam (i.e., the pure $H_2O$ vapor) from the pure hydrogen ($H_2$ gas) produced by the hydrothermal reaction. In some embodiments, the hydrogen gas is output through an $H_2$ output valve 240 and stored in a $H_2$ holding tank 243 coupled to the $H_2$ output valve 240.

The steam is output through $H_2O$ output valve 238 in the HT/HP heat exchanger 210. As a consequence of the heat transfer that takes place between the first coil 234 and the second coil 236 within the HT/HP heat exchanger 210, the temperature of the steam that is output from the HT/HP heat exchanger 210 is significantly lower than the temperature at which the steam and $H_2$ are output from the BCC 202. In some embodiments, the temperature of the steam may be as low as 105° C. (220° F.). In other embodiments, the output of the steam/$H_2$ separator 206 may be at temperatures below the temperature (100° C.) at which the steam condenses to distilled water prior to exiting the HT/HP heat exchanger 210. Nonetheless, in many embodiments, the temperature of the $H_2O$ output from the HT/HP heat exchanger 210 that is provided to the input valve 211 of the LT/LP heat exchanger 204 will be sufficient to preheat dirty water that is presented to, and which flows through the LT/HP heat exchanger 204.

The output from the steam/$H_2$ separator 206 is provided to a first coil 244 of the LT/LP heat exchanger 204 through an $H_2O$ input valve 211. Similar to the coils of the HT/HP heat exchanger 210, a second coil 245 of the LT/HP heat exchanger 204 is thermally coupled the first coil 244 to allow heat to be transferred from the $H_2O$ flowing through the first coil 244 to the dirty water flowing through the second coil 245 and thus pre-heat the dirty water. The $H_2O$ that flows through the first coil 244 of the LT/LP heat exchanger 204 is output as distilled water through a distilled water output valve 256. In some embodiments, the output valve 256 is coupled to a distilled water pump 216. The pump 216 pumps the distilled water that is output from the LT/LP heat exchanger 204 back to the BCC 202. The distilled water that is output from the LT/LP heat exchanger 204 originated in the BCC 202 and returns to the BCC 202 to enable the hydrothermal reaction to continue to take place in the BCC 202. That is, a complete closed circuit is formed from the output of the BCC 202 through the first coil 234 of the HT/HP heat exchanger 210, the first coil 244 of the LT/LP heat exchanger 204 and back to the BCC 202. It should be noted that the water that is pumped back to the BCC 202 by the distilled water pump 216 retains some of the heat prior to being returned to the BCC 202. Any heat that is retained by the distilled water will increase the ease with which the reaction will occur in the BCC 202.

Looking now at the circuit that is formed through the second coil 236 of the HT/HP heat exchanger 210 and the second coil of the LT/LP heat exchanger 204, dirty water is received by the LT/LP heat exchanger 204 from an external source through an input port 207. In some embodiments, the dirty water is wastewater produced by fracking. The dirty water typically is received at a temperature of approximately 20° C. However, the temperature of the dirty water can vary significantly depending upon the source and conditions under which the disclosed method and apparatus are being implemented. Water that is used in the process of fracking is provided to the LT/LP heat exchanger 204, cleaned, used to power the steam turbine 216 and output as clean, distilled water. In some embodiments, the dirty water is feed to the input valve 207 through a pump 242. The dirty water flows through the second coil 245 within the LT/HP heat exchanger 204.

In some embodiments, an $H_2O$/contaminant separator 212 resides near the output of the second coil 245. In embodiments in which the dirty water has particulates that can be filtered out, the $H_2O$/contaminant separator 212 performs this filtration upon the pre-heated dirty water that flows out of the second coil 245. The elements that have been filtered out are output from the $H_2O$/contaminant separator 212. In some such embodiments, the elements that have been filtered out can be ejected by a particulate blow-down pump 246. A second output 248 from the $H_2O$/contaminant separator 212 is coupled to an interconnecting pipe 250 that transmits the pre-heated output from the LT/LP heat exchanger 204 to a gray water input valve 252 to the HT/HP heat exchanger 210. The gray water input valve 252 is coupled to the input side of the second coil 236 in the HT/HP heat exchanger 210. As the dirty water flows through the second coil 236, the heat that is transferred to the contents of the second coil 236 from the first coil 234 will cause the contents to transition to a gaseous state. The steam/waste separator 208 at the output side of the second coil 236 separates the steam (clean, distilled $H_2O$) from the contaminants and other elements that were present in the dirty water. Contaminants are output from the steam/waste separator 208 through a contaminant output value 253. In some embodiments, a flush pump 254 provides a means to urge the elements removed from the dirty water to traverse from the contaminant output value 253 to a location where these elements can be further processed or disposed of.

Pure steam ($H_2O$ gas) is output from the steam/waste separator 208 through a steam output value 255. In the embodiment shown in FIG. 2, the steam that is output from the steam/waste separator 208 is used to propel a steam turbine 216. Since the steam is clean $H_2O$, it can be released directly into the atmosphere. Alternatively, the steam output 255 from the steam/waste separator 208 can be captured after running through the turbine 216. In some embodiments, the captured steam is collected in a steam/water collector 218, condensed to liquid $H_2O$ and output through a distilled water output valve 257. The distilled water output from the steam/water collector 218 can be stored in a distilled water storage tank 258 or transported to a distribution center for bottling or distribution to locations where the distilled water will be used. Accordingly, unlike the circuit for the $H_2O$ output from the BCC 202, the circuit for the dirty water is an open circuit in which dirty water enters at one end and distilled water is output at the other end. In the embodiment shown in FIG. 2, the steam turbine 216 is included in the circuit to take advantage of the energy coupled in the form of heat to the dirty water circuit from the closed BCC circuit. It should also be noted that while the BCC circuit is closed for $H_2O$, aluminum that enters the BCC 202 interacts with the $H_2O$ within the BCC 202. In addition, $H_2$ that is released in the course of the reaction that occurs in the BCC 202 is mixed with the $H_2O$ that flows in the $H_2O$ BCC circuit and is extracted by the steam/$H_2$ separator 206. Therefore, while the circuit is closed for $H_2O$, $H_2$ is introduced and removed from the circuit.

In addition, it should be noted that aluminum hydroxide precipitates to the bottom of the BCC 202. The Aluminum hydroxide is removed through an aluminum hydroxide valve 260 at the bottom of the BCC 202. In addition, in some embodiments, in which the dirty water is a brackish or salt water solution, brine and salt are produced as output elements of the plant 200.

Figure 3:
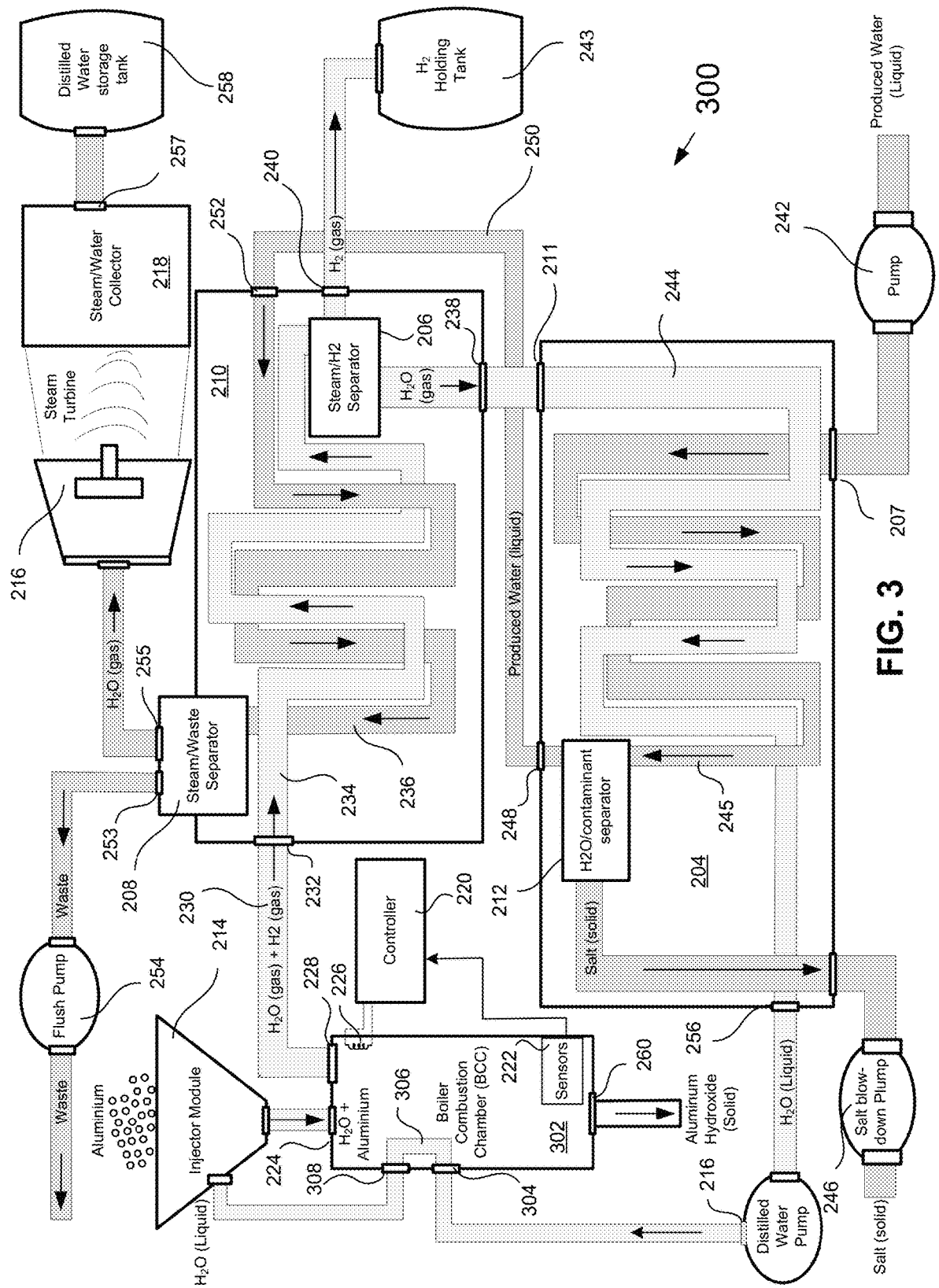
FIG. 3 is an illustration of a plant in accordance with presently disclosed method and apparatus in which the distilled water is preheated in a BCC.

FIG. 3 is an illustration of a plant 300 in accordance with presently disclosed method and apparatus in which the distilled water is preheated in a BCC 302. The BCC 302 is essentially the same as the BCC 202 described above. However, the BCC 302 has a preheater input valve 304. The plant 300 operates essentially the same as the plant 200 shown in FIG. 2. However, the distilled water that is output through the distilled water output valve 256 of the LT/LP heat exchanger 204 is coupled from the distilled water pump 216 to a preheater input valve 304 in the BCC 202. In some embodiments, the preheater input valve 304 is coupled to a section of pipe 306 within the BCC 202 that allows the heat that is generated within the main chamber of the BCC 302 to be thermally coupled to the distilled water that flows through the pipe 306. The distilled water then exists the section of pipe 306 through a preheater output valve 308. The output valve 308 is coupled to the injector module 214. The distilled water is then injected into the main chamber of the BCC 302, together with the aluminum that is provided as fuel for the hydrothermal reaction within the BCC 302. The particular configuration of the pipe 306 that places the distilled water into thermal contact with the contents of the BCC 302 is not of particular consequence, but should result in a reasonably efficient heat exchange between the contents of the BCC 302 and the distilled water within the pipe 306.

Figure 4:
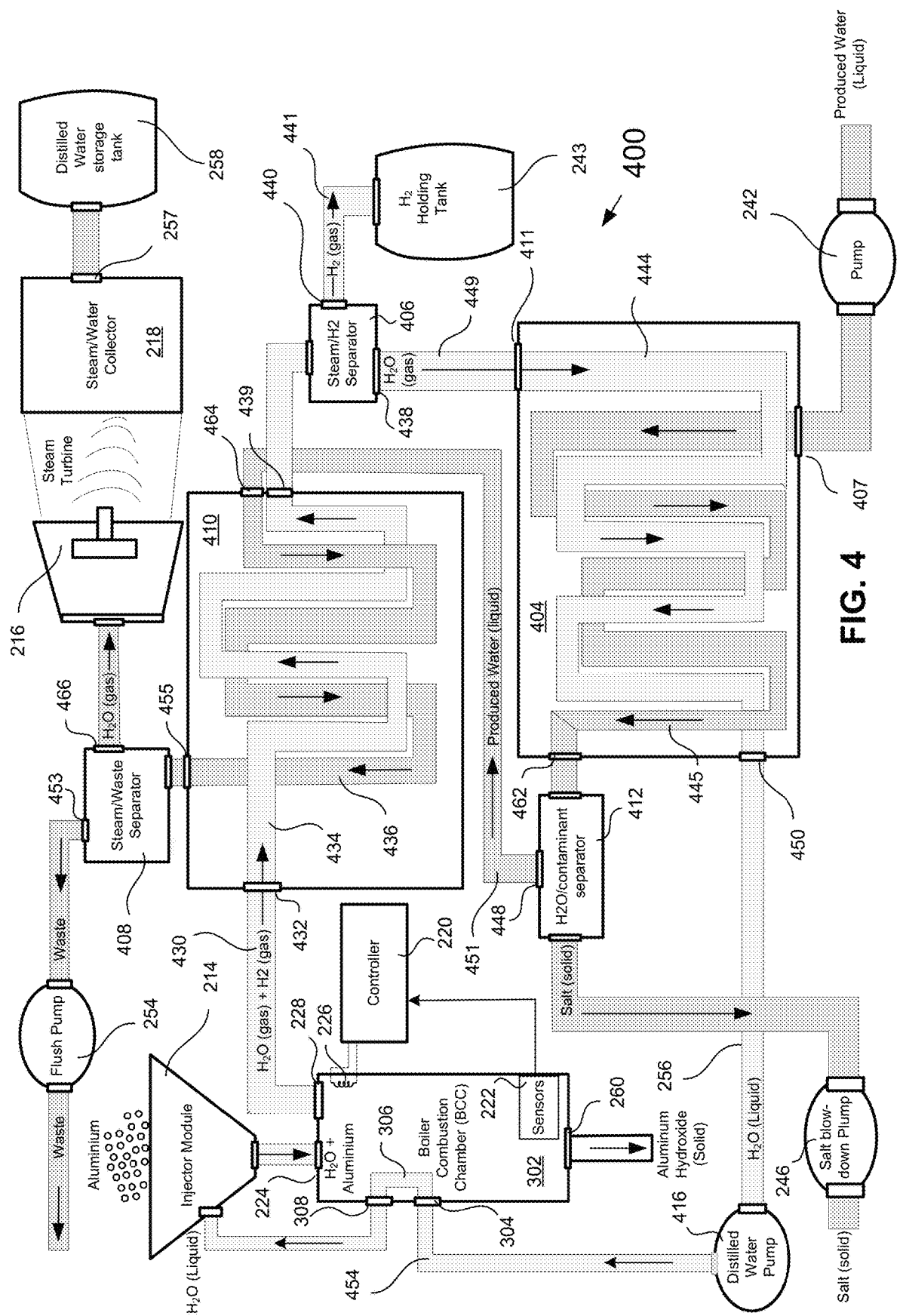
FIG. 4 is an illustration of a plant in which a steam/$H_2$ separator and a steam/waste separator are located outside a HT/HP heat exchanger.

FIG. 4 is an illustration of a plant 400 in which a steam/$H_2$ separator 406 and a steam/waste separator 408 are located outside a HT/HP heat exchanger 410. In addition, a $H_2O$/contaminant separator 412 is located outside a LT/LP heat exchanger 404. Steam mixed with hydrogen gas that exists the BCC 202 through a steam/$H_2$ output valve 228 flows through a high temperature steam pipe 430 to steam/$H_2$ input valve 432 in the HT/HP heat exchanger 410. The steam and hydrogen gas flow through a first coil 434 of the HT/HP heat exchanger 410. Heat is coupled from the contents of the first coil 434 to the contents of a second coil 436 of the HT/HP heat exchanger 410. The distil end of the first coil 434 is coupled to a steam/$H_2$ output valve 437 that outputs the steam and hydrogen gas at a temperature that is lower than the temperature at which the steam and hydrogen gas were output from the BCC 202. A pipe 439 transports the steam and hydrogen gas to the steam/$H_2$ separator 406. The steam/$H_2$ separator 406 separates the steam from the hydrogen gas. In some embodiments, the hydrogen gas is output through an $H_2$ output valve 440 to a pipe 441 that transports the hydrogen gas to a $H_2$ holding tank 243.

The steam is output from the steam/$H_2$ separator 406 through a steam output valve 438 in the steam/$H_2$ separator 406 and transported by a pipe 449 to a steam input valve 411 in the LT/LP heat exchanger 404. The steam input valve 411 couples the steam to a first coil 444 within the LT/LP heat exchanger 404. Heat from the contents of the first coil 444 is thermally coupled to the contents of a second coil 445 within the LT/LP heat exchanger 404. In some embodiments, the temperature of the steam is reduced to a temperature at which the steam condenses to distilled water. The distilled water is output from the LT/LP heat exchanger 404 through a distilled water output valve 450. The valve 450 is coupled to a pipe 452 that transports the distilled water from the LT/LP heat exchanger 440 to a distilled water pump 416. The pump 416 assists in transporting the distilled water through a pipe 454 to a preheater input valve 304 in the BCC 302. The preheater input valve 304 couples the distilled water to the pipe 306. The preheated distilled water is then output through the preheater output valve 308 and transported to the injector module 214, similar to what is described above with regard to FIG. 3.

Similar to the plant 300 described above with regard to FIG. 3, water that is used in a process of fracking is provided to the LT/LP heat exchanger 204, cleaned, used to power the steam turbine 216 and output as clean, distilled water. In some embodiments, the dirty water is feed to the input valve 407 through a pump 242. The dirty water flows through the second coil 445 within the LT/HP heat exchanger 404. In the course of flowing through the second coil 445, the dirty water is heated by the heat transferred from the first coil 444. In some embodiments, the dirty water is heated to a temperature just below the point of transitioning to $H_2O$ gas (i.e., steam). In other embodiments, the dirty water is heated to a temperature just above the point of transition to steam. The dirty water exits the LT/LP heat exchanger 404 through a dirty water output valve 462 (either as steam or hot liquid). The dirty water output valve 462 couples the contents output through the valve 462 to the $H_2O$/contaminant separator 412. In embodiments in which the dirty water has particulates that can be filtered out, the $H_2O$/contaminant separator 412 performs this filtration upon the pre-heated dirty water (or steam) that flows out of the valve 462.

The elements that have been filtered out are output from the $H_2O$/contaminant separator 412. In some such embodiments, the elements that have been filtered out can be ejected by a particulate blow-down pump 246. A second output 448 from the $H_2O$/contaminant separator 412 is coupled to an interconnecting pipe 451 that transmits the pre-heated output from the $H_2O$/contaminant separator 412 to a gray water input valve 464 to the HT/HP heat exchanger 410. The gray water input valve 464 is coupled to the input side of the second coil 436 in the HT/HP heat exchanger 410. In some embodiments in which the dirty water output from the LT/LP heat exchanger is in a liquid state, as the dirty water flows through the second coil 436, the heat that is transferred to the contents of the second coil 436 from the first coil 434 will cause the contents to transition to a gaseous state. In embodiments in which the dirty water is already in a gaseous state, the steam is further heated by the transfer of heat from the contents of the first coil 434.

A steam output valve 455 at the output side of the second coil 236 couples the steam from the HT/HP heat exchanger 410 to the steam/waste separator 408. The steam/waste separator 408 separates the steam (clean, distilled $H_2O$) from the contaminants and other elements that were present in the dirty water. The contaminants are output from the steam/waste separator 408 through a contaminant output value 453. In some embodiments, a flush pump 254 provides a means to urge the elements removed from the dirty water to traverse from the contaminant output value 453 to a location where these elements can be further processed or disposed of. Pure steam ($H_2O$ gas) is output from the steam/waste separator 408 through a steam output value 466. Similar to the embodiment shown in FIG. 2, the steam that is output from the steam/waste separator 408 is used to propel a steam turbine 216.

Figure 5:
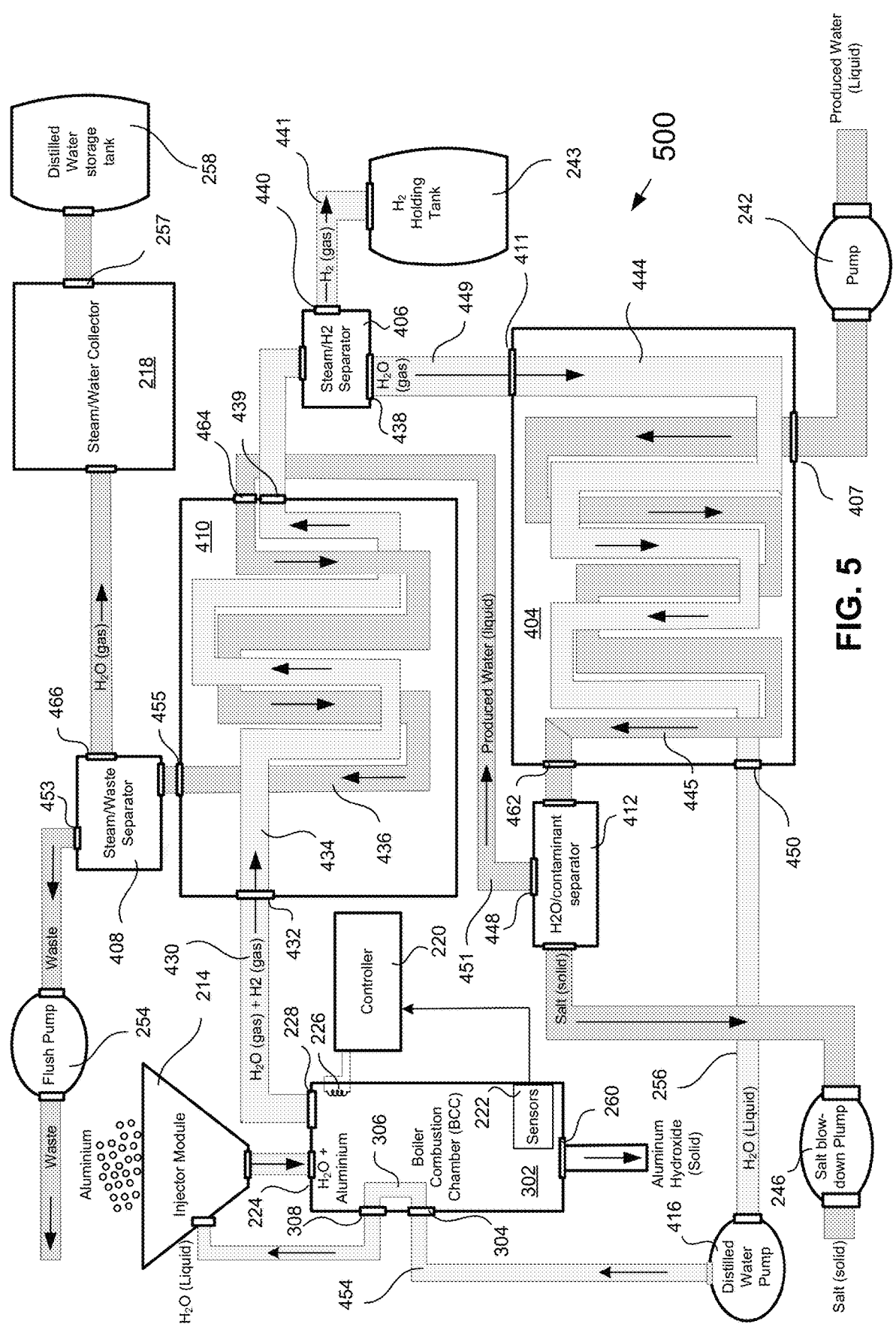
FIG. 5 is an illustration of a plant without a steam turbine.
Like reference numbers and designations in the various drawings indicate like elements.

FIG. 5 is an illustration of a plant 500 without a steam turbine. In the embodiment shown in FIG. 5, the output from the steam output value 466 of the steam/waste separator 408 is transported directly to a steam/water collector 218.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above-disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
   (a) a boiler combustion chamber (BCC);
   (b) an injector module configured to receive material comprising aluminum and water and to regulate the emission of water and aluminum into the BCC;
   (c) a heater coupled to the BCC such that the heater heats the contents of the BCC to a desired operational temperature;
   (d) a high temperature, high pressure (HTHP) heat exchanger coupled to the BCC, the HTHP heat exchanger having a first heat exchange coil and a second heat exchange coil, the contents of the first heat exchange coil being isolated from the contents of the second heat exchange coil; and
   (e) a low temperature, low pressure (LTLP) heat exchanger, the LTLP heat exchanger having a first heat exchange coil and a second heat exchange coil, the contents of the first heat exchange coil of the LTLP heat exchanger being coupled to the first heat exchange coil of the HTHP heat exchanger and isolated from the contents of both the second heat exchange coil of the HTHP heat exchanger and the second heat exchange coil of the LTHP heat exchanger, the second heat exchange coil of the LTLP heat exchanger coupled to the second heat exchange coil of the HTHP heat exchanger.

2. The system of claim 1, further comprising a LTLP inlet configured to receive liquid having contaminants, the LTLP inlet being coupled to a proximal end of the first heat exchange coil of the LTLP heat exchanger.

3. The system of claim 2, further comprising an HTHP inlet configured to receive a vaporized output from the BCC, the HTHP inlet being coupled to a proximal end of the first heat exchange coil of the HTHP heat exchanger.

4. The system of claim 3, wherein the HTHP heat exchanger comprises an HTHP outlet coupled to a distal end of the second heat exchange coil of the HTHP heat exchanger, the system further comprising a steam/waste separator having a separator inlet coupled to the HTHP outlet.

5. The system of claim 4, further comprising a steam turbine having a steam inlet coupled to a steam output of the steam/waste separator.

6. The system of claim 5, further comprising a controller configured to control a hydrothermal oxidation reaction within the BCC to produce a desired amount of heat.

7. The system of claim 6, wherein the controller controls heat added by the heater to initiate the hydrothermal oxidation reaction within the BCC.

8. The system of claim 6, wherein the injector module is configured to provide fine particles of aluminum that fuel the hydrothermal oxidation reaction.

9. The system of claim 8, further comprising a grinder, wherein the particles are ground from scrap aluminum by the grinder.

* * * * *